United States Patent
Olsson et al.

[11] Patent Number: 6,153,964
[45] Date of Patent: Nov. 28, 2000

[54] DEVICE FOR ULTRASONIC SEALING

[75] Inventors: Håkan Olsson; Magnus Råbe, both of Lund, Sweden

[73] Assignee: Tetra Laval Holdings & Finance S.A., Pully, Switzerland

[21] Appl. No.: 08/416,526

[22] Filed: Apr. 3, 1995

Related U.S. Application Data

[63] Continuation of application No. 08/213,088, Mar. 15, 1994, abandoned.

[30] Foreign Application Priority Data

Mar. 19, 1993 [SE] Sweden .................................. 9300918

[51] Int. Cl.[7] ........................... H01L 41/08; B29C 65/08
[52] U.S. Cl. ............................ 310/323.18; 310/323.19; 310/325; 156/580.1
[58] Field of Search ....................................... 310/323, 325, 310/328, 334, 26; 156/580.1, 580.2, 580.3, 73.1–73.4; 68/3 SS; 228/1.1, 110; 425/174.2; 74/1 SS; 264/23

[56] References Cited

U.S. PATENT DOCUMENTS

| | | | |
|---|---|---|---|
| 3,175,406 | 3/1965 | Eisner | 310/323 |
| 3,184,842 | 5/1965 | Maropis | 310/323 |
| 3,368,085 | 2/1968 | McMaster et al. | 310/323 |
| 3,524,085 | 8/1970 | Shoh | 310/323 |
| 3,671,366 | 6/1972 | Miller | 156/580 |
| 3,772,538 | 11/1973 | Supitilov | 310/323 |
| 4,074,152 | 2/1978 | Asai et al. | 310/334 |
| 4,363,992 | 12/1982 | Holze, Jr. | 310/323 |
| 4,483,571 | 11/1984 | Mishiro et al. | 310/323 |
| 4,607,185 | 8/1986 | Elbert et al. | 310/323 |
| 4,651,043 | 3/1987 | Harris et al. | 310/323 |
| 4,995,938 | 2/1991 | Tsutsumi | 156/580.01 |
| 5,057,182 | 10/1991 | Wuchinich | 310/325 X |

FOREIGN PATENT DOCUMENTS

| | | |
|---|---|---|
| 0 496 694 | 7/1992 | European Pat. Off. . |
| 1 168 430 | 6/1983 | Sweden . |

*Primary Examiner*—Mark O. Budd
*Attorney, Agent, or Firm*—Burns, Doane, Swecker & Mathis, L.L.P.

[57] ABSTRACT

A device for ultrasonic sealing includes a drive unit, a horn with a long and narrow sealing surface, and one or more reaction bodies which at least partially surround the drive unit. The length of the device consists of a half wave length.

17 Claims, 3 Drawing Sheets

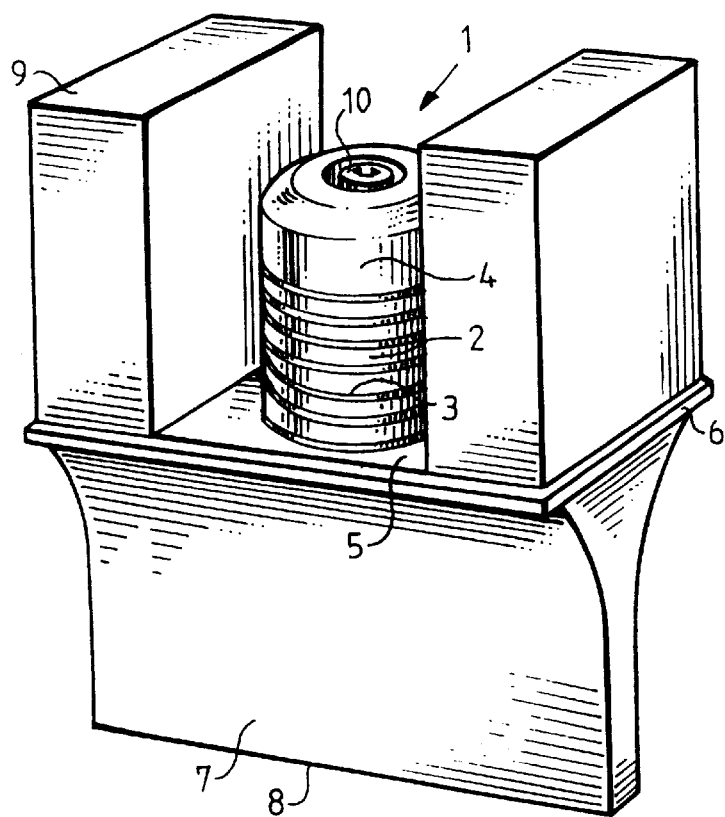
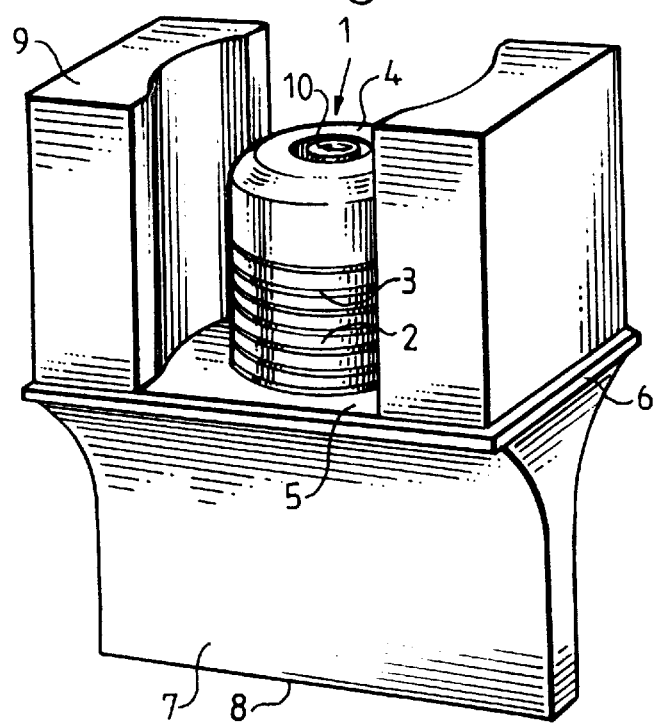

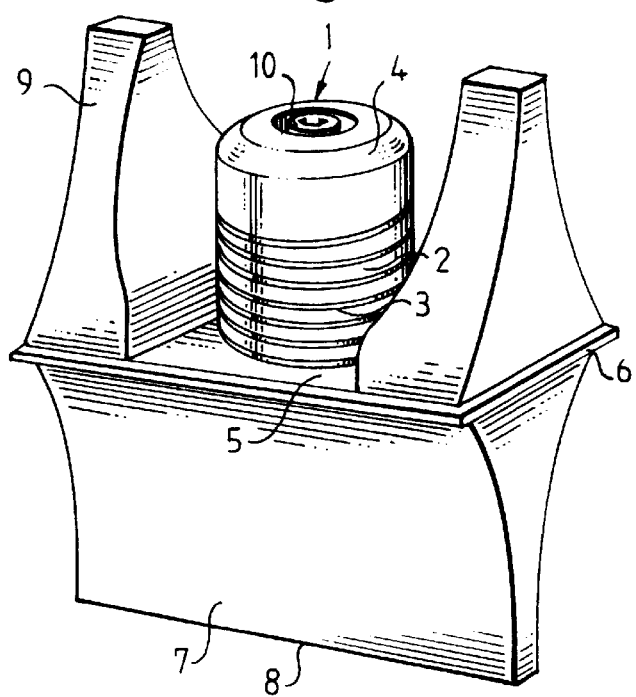
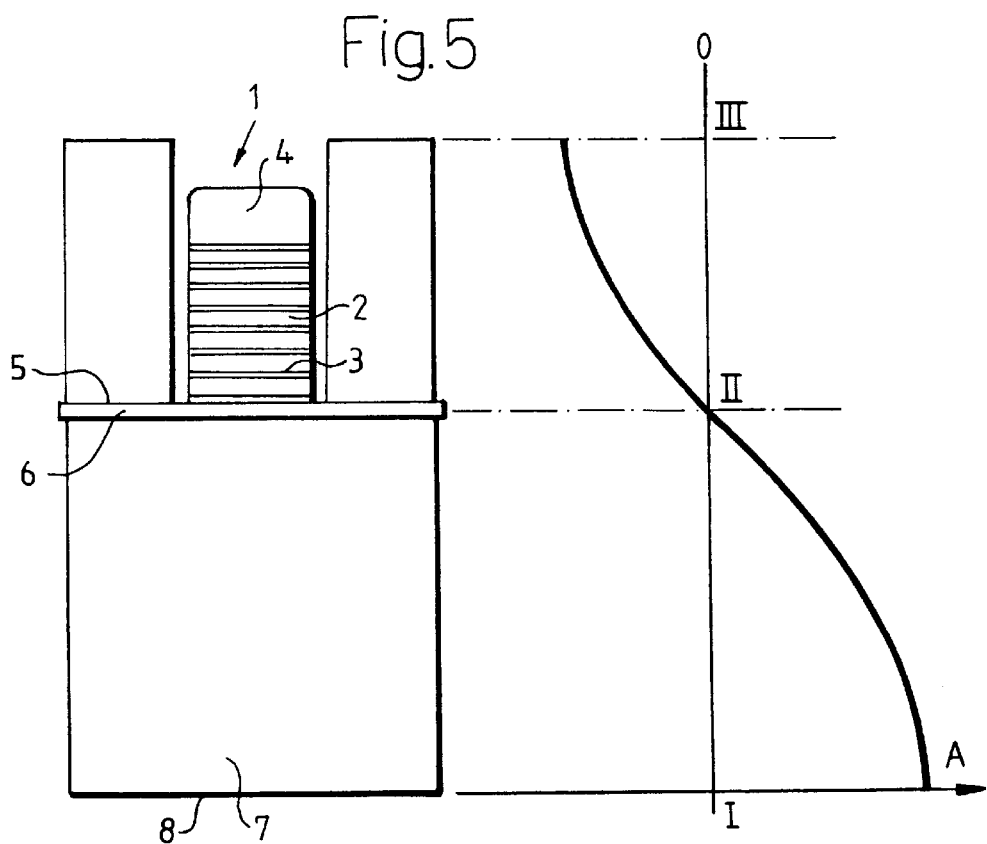

DEVICE FOR ULTRASONIC SEALING

This application is a continuation of Application Ser. No. 08/213,088, filed Mar. 15, 1994 now abandoned.

FIELD OF THE INVENTION

The present invention relates to a sealing device, and more particulary to a device for ultrasonic sealing, that includes a drive unit connected to an A.C. current source, and a horn.

BACKGROUND OF THE INVENTION

Conventional devices for ultrasonic sealing normally consist of a converter, a booster and a horn. In the converter, an electric oscillation is converted into a mechanical oscillation, and the booster is employed to fix the system mechanically and boost the amplitude. In the horn, further amplitude boosting takes place, at the same time as the horn provides the desired sealing surface. These conventional, thoroughly well-tested ultrasonic sealing devices suffer, however, from the disadvantage of being relatively bulky. For certain practical applications, it is desirable to realize an ultrasonic sealing device which requires considerably less space.

Within the packaging industry which deals with packages of the single-use disposable type, it is common to seal laminates with thermoplastic or pure thermoplastic material. These seals are normally carried out using heat or, when the laminate includes an aluminium foil, using induction heat. However, it is desirable to be able to employ ultrasonic sealing, since this method does not require a laminate which includes a metal foil. The conventional ultrasonic sealing devices have, however, proved to be far too bulky.

Small-scale ultrasonic sealing equipment has already been produced. However, these are rotation-symmetric and can only carry out spot-sealing. In the above-outlined application within the packaging industry, it is desirable to carry out transverse sealings of a certain length, i.e. a long and narrow seal.

OBJECT OF THE INVENTION

One object of the present invention is to realize an ultrasonic sealing device which is of considerably smaller dimensions than conventional equipment and which is capable of executing a long and narrow sealing joint.

SUMMARY OF THE INVENTION

This and other objects have been attained according to the present invention in that the ultrasonic sealing includes one ore more reaction bodies which, together with the horn, constitute a half wave length.

BRIEF DESCRIPTION OF THE DRAWING FIGURES

One preferred embodiment of the device according to the present invention will now be described in greater detail hereinbelow, with particular reference to the accompanying drawing figures in which like elements bear like reference numerals and wherein:

FIG. 1 is a perspective view of a device for ultrasonic sealing;

FIG. 2 is a perspective view of one embodiment of the device according to the invention;

FIG. 3 is perspective view of a further embodiment of the device according to the present invention;

FIG. 5 is a graph illustrating the principle for the amplitude of the device.

DESCRIPTION OF PREFERRED EMBODIMENT

Figure 4:
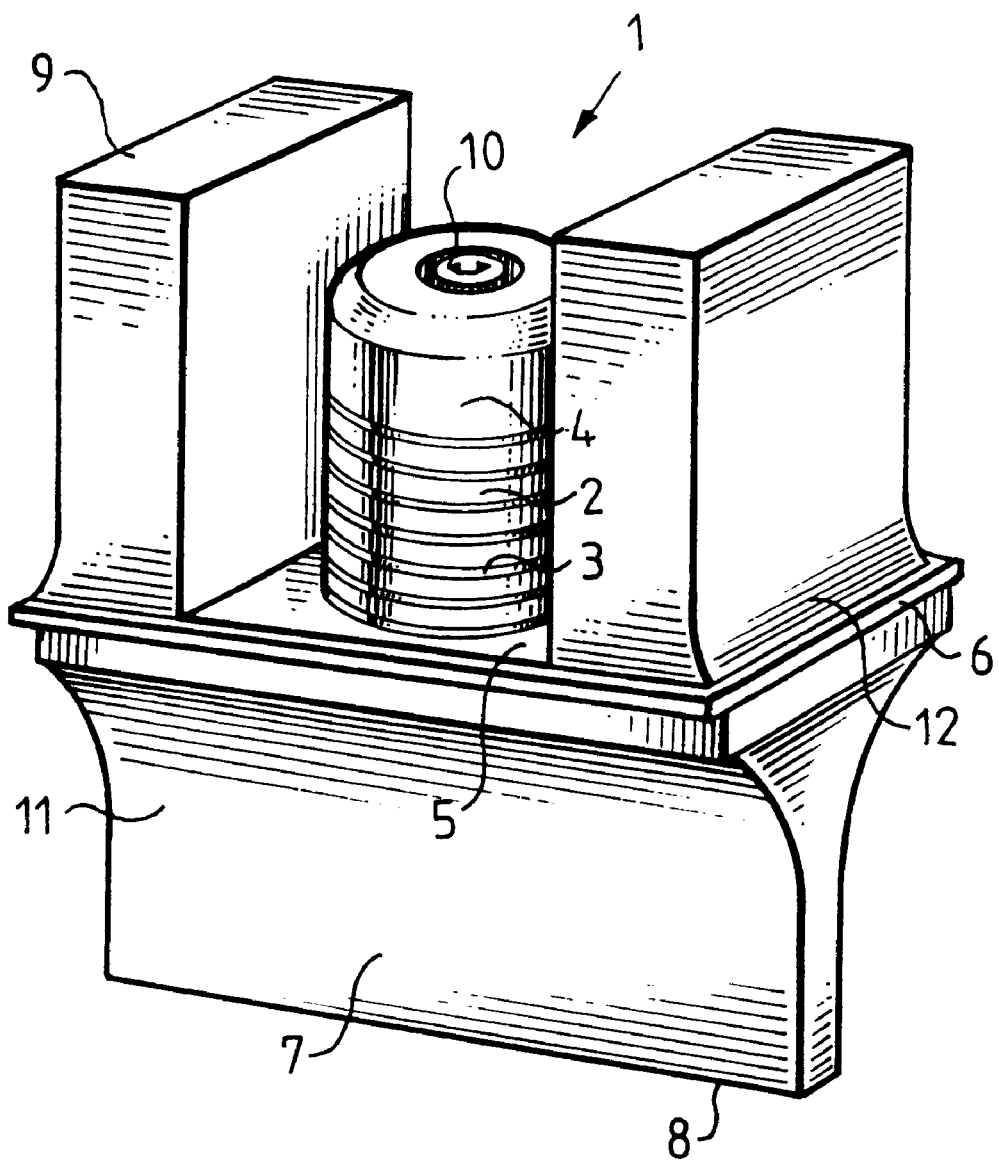
FIG. 4 is perspective view of still a further embodiment of the device according to the present invention.

To be able to employ ultrasonic sealing in filling machines, a compact sealing device is necessary in which a uniform oscillation amplitude is maintained at the entire sealing surface so that an even and dependable seal along the entire transverse seam or joint will be obtained.

FIG. 1 shows the principle of an ultrasonic sealing device according to the invention, which has compact constructional dimensions and is of a design which makes possible a uniform and efficient sealing along the entire sealing surface. The device consists of a drive unit 1 of conventional type which generates the oscillation. In the preferred embodiment, the drive unit consists of piezoelectric ceramic plates 2 which are disposed with interjacent conductive metal sheets 3, preferably manufactured from nickel or beryllium copper. The drive unit 1 moreover consists of a counter weight 4 and the entire arrangement is mounted on the device by means of a clamping bolt 10.

Alternatively, a magnetostrictive drive unit 1 may be employed. The drive unit 1 is coupled to an A.C. current source (not shown).

The plane beneath the drive unit 1 constitutes the nodal plane 5 of the device. The mechanical fixation of the system takes effect herein and the slightly bevelled edge 6 simultaneously serves as fixation edge and makes possible securement of the device. The securement of the device should be resiliently yieldable so as to compensate for certain residual oscillations in the nodal plane.

Beneath the nodal plane 5, a horn 7 is located in which the amplitude boosting takes place. The horn 7 provides the device with its desired sealing surface 8. The shape of the horn 7 should taper towards the sealing surface 8. This shape may, for example, be obtained by shaping the horn 7 so that it is reduced, from its largest surface of extent at the nodal plane 5, with a curved side surface 11 to the sealing surface 8 as shown in FIG. 4. Alternatively, this configuration may be made to be exponentiallike, i.e. be exponential or catenoid. The sealing surface 8 is preferably long and narrow in order to be able to achieve the desired transverse seal on a package blank. The sealing surface 8 is suitably provided with one or more grooves where the actual heating against the material takes place. Alternatively, the back-up surface (not shown) may be provided with grooves, while the sealing surface 8 is smooth. Yet a further alternative is to divide up the sealing surface 8 into two narrower mutually discrete but parallel sealing surfaces 8. Like the fixation edge 6, the horn 7 is manufactured from a light metal or light metal alloy, preferably aluminium, but other metals such as titanium may also be employed.

The device further includes reaction masses, so-called reaction bodies 9 which surround the drive unit. These reaction bodies 9 are similarly manufactured from a light metal, preferably aluminium, so that the horn 7, the fixation edge 6 and the reaction bodies 9 constitute a homogeneous block. Alternatively, these parts may be manufactured separately and subsequently assembled. The reaction bodies 9 may be of different configurations, but should be as large as possible and, in the preferred embodiment according to FIG. 2, they are therefore provided with a gently rounded surface facing the drive unit 1. The reaction bodies 9 may be of exponential configuration which is similarly rounded facing the drive unit 1, as shown in FIG. 3, or a curved side surface 12 as shown in FIG. 4. The reaction bodies 9 may also be designed as a completely continuous mass which wholly or partly surrounds the drive unit 1.

By combining, in an appropriate manner, the configuration of the horn 7 and the design of the reaction bodies 9, the intention is to obtain a resonance frequency which is as pure as possible, without disrupting elements from other resonance frequencies in the proximity of the frequency chamber.

The above-disclosed ultrasonic sealing device according to FIGS. 1–3 realizes a long and narrow sealing which corresponds to the length of the sealing surface 8. When a longer sealing surface 8 is desired, a plurality of ultrasonic sealing devices according to the invention may be interconnected for additional length. Alternatively, longer devices may be manufactured, which then require slits in the horn 7 so as to compensate for the lateral oscillations which occur. However, a longer horn 7 gives a more uneven amplitude at the sealing surface 8, which may result in an uneven seal.

When the device according to the invention is connected to the A.C. current source (not shown) via the drive unit 1, the piezoelectric ceramic pack 2 converts the electrically supplied voltage into a mechanical strain which supplies energy to the horn 7 which, in such instance, begins to oscillate. When the horn 7 begins to oscillate, counter forces (counter oscillations) occur which are assimilated by the reaction bodies 9. In this instance, a nodal plane 5 occurs between these oscillations which, in principle, consists of the fixation edge 6 of the device.

FIG. 4 shows the amplitude of the device. The device constitutes a half-wave resonator with a centrally located nodal plane 5 where the amplitude is equal to 0. The entire length of the device thus consists of half a wave length. The device is dimensioned so that a common nodal plane 5 occurs for each point in the device. The reaction bodies 9 must also be designed so that no undesired oscillations occur.

As will have been apparent from the foregoing description, the present invention realizes a device for ultrasonic sealing which constitutes a compact unit which can execute a long, narrow and uniform seal.

While this invention has been illustrated and described in accordance with a preferred embodiment, it is recognized that variations and changes may be made by others, and equivalents employed, without departing from the invention as set forth in the claims.

What is claimed is:

1. A device for being fixedly secured in a machine to ultrasonically seal together two plastic layers along a long and narrow sealing joint, comprising a cylindrically shaped drive unit for being connected to an A.C. current source to generate an oscillation, a horn which oscillates during operation of the drive unit and which has one end at which is mounted the drive unit and an opposite end, the opposite end of the horn having a long and narrow end surface which defines a sealing surface for producing a long and narrow sealing joint during operation of the drive unit, and at least one reaction body mounted at the one end of the horn for assimilating counter forces created during oscillation of the horn to produce a nodal plane located below the drive unit, the at least one reaction body and the horn together defining a length of the device which is half a wave length.

2. The device as claimed in claim 1, wherein the drive unit comprises piezoelectric ceramic plates.

3. The device as claimed in claim 1, wherein the drive unit comprises a magnetostrictive unit.

4. The device as claimed in claim 1, including a fixation edge for fixing the device within a machine, the fixation edge being disposed at the nodal plane.

5. The device as claimed in claim 4, wherein the nodal plane is positioned between the horn and the at least one reaction body, the horn having a curved side surface extending between the nodal plane and the sealing surface.

6. The device as claimed in claim 4, wherein the horn has an exponential configuration.

7. The device as claimed in claim 4, wherein the horn has a catenoid configuration.

8. The device as claimed in claim 1, wherein the at least one reaction body includes two reaction bodies that at least partially surround the drive unit.

9. The device as claimed in claim 8, wherein the reaction bodies each have a curved outwardly facing side surface.

10. The device as claimed in claim 9, wherein the reaction bodies are of substantially parallelepipedic configuration with a concave surface portion facing towards the drive unit.

11. The device as claimed in claim 8, wherein the reaction bodies are of an exponential configuration with a concave surface portion facing towards the drive unit.

12. The device as claimed in claim 10, wherein the nodal plane constitutes a mechanical fixation point.

13. The device as claimed in claim 1, wherein the horn and the reaction bodies are comprised of light metal.

14. The device as claimed in claim 13, wherein the light metal is aluminum.

15. A device for ultrasonically sealing together two plastic layers along a sealing joint in a package filling machine, comprising a cylindrically shaped drive unit connected to an A.C. current source for generating an oscillation having an amplitude, a horn for boosting the oscillation amplitude generated by the drive unit, said horn oscillating during operation of the drive unit and having a first end at which is positioned said drive unit and a second end located opposite said first end, said second end of said horn having an end surface which is long and narrow and which defines a sealing surface for producing a long and narrow sealing joint between two plastic layers during operation of the drive unit, two reaction bodies positioned at and extending away from the first end of the horn for assimilating counter oscillations which occur during oscillation of the horn to produce a nodal plane located adjacent the first end of the horn, the reaction bodies being positioned on opposite sides of the drive unit with portions of each reaction body being located adjacent an outer edge of the first end of the horn, the reaction bodies and the horn together defining a length of the device which is half a wavelength, and a fixation edge for fixedly securing the device in a package filling machine, said fixation edge being located at the nodal plane.

16. A device according to claim 15, wherein said horn tapers in width in a curved manner from the nodal plane to the sealing surface so that the width of the horn is smallest at the sealing surface.

17. The device according to claim 15, wherein said two reaction bodies are spaced apart with the drive unit being positioned between the reaction bodies.

* * * * *